United States Patent Office 2,809,524
Patented Oct. 15, 1957

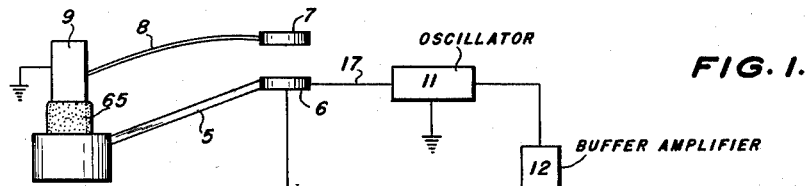
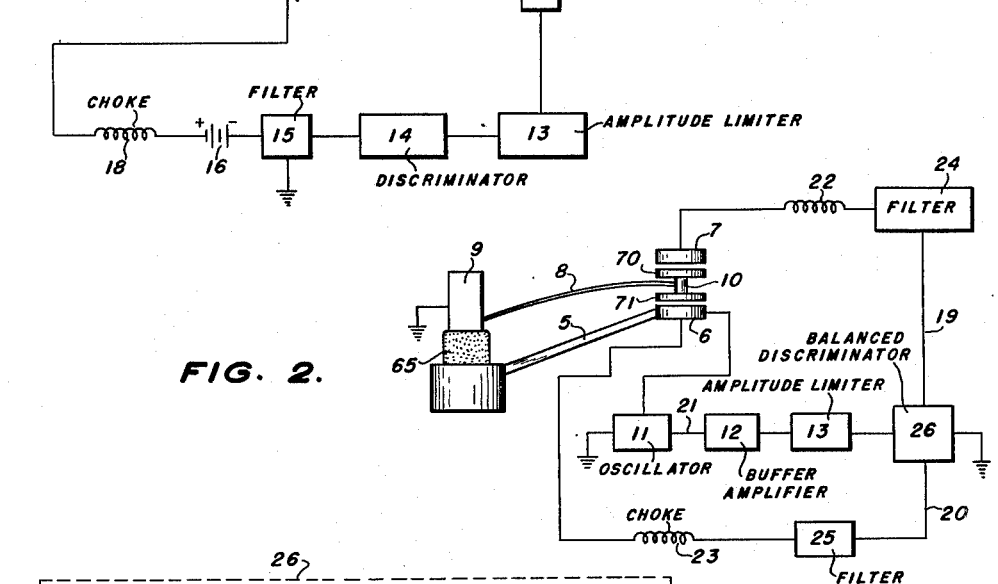
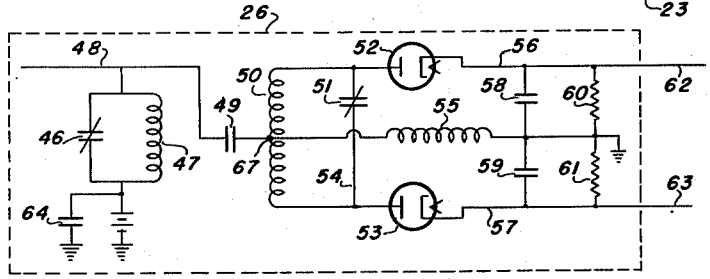
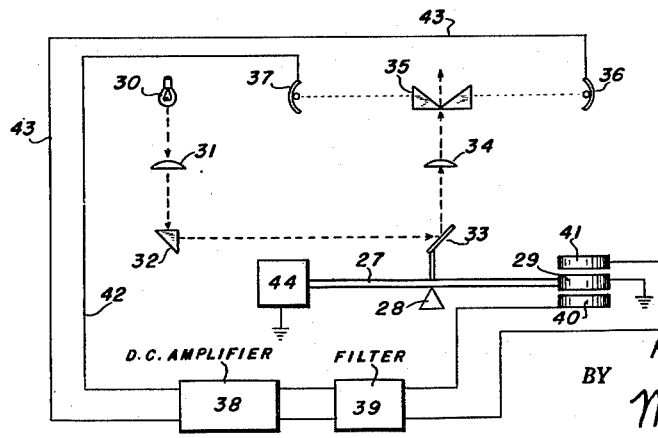
INVENTOR.
Horace T. Masterson,
BY
ATTORNEY.

2,809,524

AUTOMATIC DAMPING OF A GRAVIMETER

Horace T. Masterson, Houston, Tex., assignor, by mesne assignments, to Esso Research and Engineering Company, Elizabeth, N. J., a corporation of Delaware Application January 11, 1954, Serial No. 403,342

6 Claims. (Cl. 73—382)

This invention relates to gravimeters and more particularly this invention relates to a means for detecting unwanted oscillations or vibrations of a gravimeter and a means for converting said detected oscillations into a damping force which is fed back electrically to the gravimeter.

It is well known that in prospecting for oil gravimetric measurements are taken in order to obtain an indication of the density of subsurface strata with a view to obtaining data as to the lithologic structure of the earth in the area where the gravimetric measurements are obtained. These measurements of necessity must be very accurate and any outside influences on the gravimeter such as due to movements of the earth should be eliminated as much as possible. However, in practice it has been found that it is very difficult to eliminate all outside influences and in order to obtain an accurate reading of conventional gravimeters within a reasonable time it is desirable to damp out the unwanted oscillations and vibrations quickly. Electrostatic methods of damping gravimeters have been utilized before. However, previous methods of electrostatic damping having necessitated the use of a manually operated switch which when closed applies a direct current to electrostatic plates disposed on either side of the gravimeter beam, the resultant attraction between the plates and the beam of the gravimeter causing a damping of the oscillations of said gravimeter. The application of the damping force has not been automatic in response to the slightest oscillation of the gravimeter but has been applied by an operator who closes the switch when he becomes cognizant of excessive vibrations. Therefore, an instrument which would apply an electrostatic damping force automatically upon the most minute oscillation without the necessity of an operator closing an electric switch would be highly desirable.

It is an object, therefore, of this invention to provide an automatic electrostatic damping means for gravimeters.

It is a further object of this invention to produce an electrical signal which is indicative of the magnitude of oscillations in a gravimeter and converting said electrical signal into an electrostatic damping force which is proportional to the magnitude of said gravimeter oscillations.

It is a further object of this invention to provide a means for electrostatic damping which is automatic when oscillations are present in the gravimeter but which will not apply a damping force when the gravimeter is influenced only by gravitational forces.

Briefly described, my invention consists of a means for detecting oscillations or vibrations of a gravimeter and a means for applying an electrostatic force proportional to the magnitude of gravimeter oscillations for the purpose of damping said oscillations. The electrical detecting means may take the form of an oscillator, the frequency of said oscillator being varied in accordance with the change of capacity between condenser plates caused by the movement in response to gravitational force of a movable condenser plate, with respect to a relatively stationary electric condenser plate. This type of electrical detecting means is particularly applicable in damping out unwanted oscillations in an electrostatic or capacity-type gravimeter. Another manner of detecting the oscillations of a gravimeter is to utilize a pair of photoelectric cells which are so positioned with respect to a light source as to generate equal voltages when the gravimeter beam is stationary but which generate different voltages when the beam oscillates, the voltage difference generated by said photoelectric cells being proportional to the magnitude of the oscillations of said gravimeter. This type of electrical detecting means may find appropriate application with the conventional beam-type gravimeter.

When the capacity-type gravimeter is utilized in taking gravity measurements the frequency modulated signals are amplified, then amplitude limited by means of an amplitude limiter, and then the current is passed into a discriminator. The purpose of the discriminator is to convert the change in frequency from a preselected frequency in the electrical oscillator into a voltage which is proportional to the change in frequency above or below the preselected frequency, said change in frequency being proportional to the magnitude of the oscillations in the gravimeter, and then to feed said voltage back to the condenser plates in order to electrostatically damp the unwanted oscillations. Before reaching the condenser plates, the current is passed through a filter of conventional design and built to filter out very low frequencies below ⅛ of a cycle per second and to pass through higher frequencies. Hence it can be seen that by the provision of such a filter the direct current occasioned by the effect of the gravitational force will not be applied to the gravimeter. Therefore, I have provided a means for damping the oscillations of a gravimeter which is automatic and yet does not operate when the gravimeter is influenced solely by gravity.

In the application of my damping means to the beam-type gravimeter the oscillations of the beam create an oscillating voltage difference between the two photoelectric cells which is proportional to the magnitude of the oscillations of said beam gravimeter. This voltage difference is electrically conducted to a direct-coupled amplifier and from said amplifier through a filter and from said filter to electrostatic plates which act upon a damping vane connected to one end of the gravimeter beam to thereby damp the oscillations of the beam.

The nature of the invention and the manner in which it is performed will become more apparent from the ensuing description and from the drawing, in which:

Fig. 1 is a side elevational view of a capacitance type gravimeter with the electrical system shown in block diagram;

Fig. 2 is a view partially in side elevation and partially in block diagram showing another embodiment of my invention;

Fig. 3 is a circuit diagram of the discriminator used in Fig. 2; and

Fig. 4 is a diagrammatic view of still another embodiment of my invention.

Referring more particularly to the drawing, in Fig. 1 my invention is shown as applied to an electronic type gravimeter such as shown in Patent No. 2,322,681. Briefly described, the electronic type gravimeter consists of an inclined arm 5 upon the free end of which is fixed a steel plate 6. A leaf spring 8 has one of its ends connected to a standard 9 carried by arm 5 and carries at its other end a second plate 7 which is identical with plate 6. The standard 9 is insulated from arm 5 by insulation 65. Electrically connected to the plate 6 by means of an electric conductor 17 is an oscillator 11 of conventional design. The oscillator 11 is set to oscillate at a particular preselected fixed frequency unless the frequency is changed by movement of plate 7. However, when plate 7 oscillates, the capacity of the condenser formed by plates 7 and 6 is changed, the change in capacity causing a change in the frequency of the oscillations in the oscillator. The resulting frequency-modulated signal is fed through a buffer amplifier 12. The purpose of the buffer amplifier 12 is to eliminate the effect of the load on the frequency of the oscillator 11 since any load impedance effects the resonant frequency. The frequency-modulated signal is fed from the buffer amplifier into an amplitude limiter 13. The amplitude limiter 13 is utilized to reduce the amplitude of the incoming signal so as to maintain the amplitude at a constant value for a purpose to be subsequently described. From the amplitude limiter 13 the frequency-modulated signal is fed to a means for converting said frequency modulations into a voltage proportional to the amount of modulation. This may take the form of a discriminator 14. The discriminator 14 is responsive to both amplitude changes and frequency changes in the incoming electrical signal. For my purpose, however, I want to present to the discriminator a pure frequency-modulated signal. Therefore, the amplitude limiter 13 is positioned so as to present a constant-amplitude signal to the discriminator. Hence, the voltage output of the discriminator is proportional solely to frequency changes and is not influenced by any amplitude changes. From the discriminator 14 the signal is passed through a filter 15, said filter serving to filter out very low frequencies. Connected to the filter is a battery 16 for applying a bias voltage between the plates 6 and 7. The plate 7 can be calibrated to show the effect of the bias voltage on the neutral position of the plate 7 and, therefore, a true reading of gravitational force may be obtained. Also provided in the circuit is a choke 18.

In Fig. 2 is shown a modification of my invention which may also be applied to an electronic-type gravimeter. I provide additional plates 70 and 71 connected together by an interconnecting member 10 which are influenced by a potential applied to either of the plates 6 or 7. In place of the battery 16 shown in Fig. 1 a balanced discriminator 26 is used in the circuit for applying a damping voltage to either plate 6 or 7 depending upon whether the change in frequency detected by the balanced discriminator is above or below the preselected frequency. Also provided in the electrical circuit of Fig. 2 is a filter 24 and a choke 22 for voltages through electrical conductor 19 and a filter 25 and a choke 23 for voltages through electrical conductor 20.

In Fig. 3 there is shown an electrical circuit diagram of the discriminator used in the gravimeter described with reference to and shown in Fig. 2. The input electrical signal is transmitted into the discriminator by means of wire 48. The output electrical system consists of two electrical circuits, one circuit consisting of one-half of the inductance of coil 50 which is center-tapped at 67, diode 52, condenser 58, resistance 60 and coil 55. The second circuit consists of the other half of coil 50, diode 53, condenser 59, resistance 61 and inductance coil 55. The inductance coil 55, as shown in Fig. 3, is common to both circuits. Condenser 49, in series with inductance 55, is connected in parallel with the circuit including condenser 46 and inductance 47. Condensers 49, 59 and 64 give negligible opposition at the high frequency values received by the discriminator. The reference voltage for the discriminator is, therefore, the voltage across the primary coil 47. At resonant frequency, which is the frequency originally set up by the oscillator 11, the same current will flow through each diode 52 and 53 and the voltages which appear across resistances 60 and 61 are equal and, being in opposition, will cancel out. Therefore, no output is derived. If a higher than resonant frequency is detected by the discriminator, resistance 60 will then develop a larger voltage than resistance 61 and the output voltage will be positive with respect to ground.

If the frequency detected by the discriminator is less than resonant frequency the output voltage across resistance 61 will be larger than the output voltage across resistance 60. The resulting output voltage then becomes negative with respect to ground. A positive output voltage will be transmitted through electrical conductor 62 to one of the condenser plates and a negative voltage will be conducted through electrical conductor 63 to the other condenser plate. The discriminator 14 used in the system of Fig. 1 is similar to the balanced discriminator 26 except that the lower end of resistance 61 is connected to ground instead of the upper end and the voltages regardless of polarity are applied to plate 6.

In Fig. 4 there is shown still another modification of my invention. The electrostatic damping system shown there has particular application to the damping of a beam-type gravimeter. As shown in Fig. 4, the electrical detecting means for detecting oscillations of the beam consists of a pair of photoelectric cells 36 and 37 and a prism 35 which is so positioned as to present equal amounts of light from a light source 30 to the photoelectric cells when no oscillations are present. In this stable state of the gravimeter no difference in voltage will be generated to electrical condensers 40 and 41 and no damping of the gravimeter will occur. The light from light source 30 is focused by means of a lens arrangement 31 onto a reflecting prism 32, thence to a reflecting mirror 33. Reflected light passes from mirror 33 and through lens 34 to the beam splitting prism 35. If, however, unwanted oscillations of the gravimeter occur the amount of light hitting one of the photoelectric cells will be more than the amount of light hitting the other photoelectric cell during the upward swing of the beam 27 and vice versa during the downward swing of beam 27. This will cause the voltage generated in one cell to be greater than that generated in the other. The voltage so received is passed through a direct-coupled amplifier 38 which is a conventional direct-coupled amplifier capable of amplifying extremely low frequencies. In order not to pass the direct current received by the system as a result of gravitational pull on the mass 44 of beam 27, filter 39 is used. The electrical signal passed through filter 39 is conducted to either condenser plate 40 or 41 and applies an electrostatic damping force to damping vane 29. The system is so constructed that when the voltage across photoelectric cell 36 is greater than that presented by photoelectric cell 37, due to a downward swing of damping vane 29, the electrostatic pull occurs between condenser plate 41 and the damping vane 29 and when the voltage is greater from cell 37 than from cell 36, due to an upward swing of damping vane 29, the electrostatic attraction is between plate 40 and damping vane 29.

In operation, therefore, when the damping system of Fig. 1 is utilized, a biased voltage is developed across condenser plates 7 and 6 due to battery 16. This voltage created by battery 16 is of the same polarity as the voltage across the output discriminator 14 developed by an upward movement of the condenser plate 7 which decreases the capacity between plates 7 and 6 thereby increasing the frequency of oscillator 11. Hence the attraction potential between plates 7 and 6 consists of the potential developed by battery 16 and the potential output of discriminator 14. The output voltage of discriminator 14 occasioned by a downward motion of plate 7, which results in an increase in capacity between plates 7 and 6 and a decrease in frequency of oscillator 11, is in opposition to the voltage of battery 16. Hence it can be seen that a stronger electrostatic pull is developed across plates 7 and 6 when the plates are farther apart than the pull exerted wthen the plates are closer together or, to state it otherwise, a stronger pull is exerted when the plate 7 is at its uppermost position than when the plate is at its lowermost position.

The operation of the system shown in Fig. 2 is similar to that of the instrument of Fig. 1. However, two additional plates 70 and 71 and a balanced discriminator 26 are substituted in the system in place of the battery 16. The voltage output of balanced discriminator 26 is such that when the condenser plate 71 is undergoing downward movement, thereby increasing the capacity between plates 71 and 6 and decreasing the frequency, the magnitude of the voltage is such as to apply an increased potential to plate 7. When the plate 71 is undergoing its upward swing and the capacity between plates 71 and 6 decreases the magnitude of the output voltage is such as to create an increased potential to plate 6. Hence both the systems of Figs. 1 and 2 operate similarly. Any oscillations of the gravimeter are detected by means of the system consisting of the oscillator and the condenser plates. The change in frequency occasioned thereby is amplified and limited in amplitude. The frequency-modulated signal is converted by means of the discriminator into an electrostatic damping force which is proportional to the magnitude of the oscillations. Any change in capacitance occasioned solely by gravitational influence will not influence the damping means because of the provision of the filters which do not pass direct current.

The operation of my electrostatic damping means as applied to a beam-type gravimeter is similar to its operation as applied to the electronic-type gravimeter. However, in place of the condenser plate detecting means I substitute the photoelectric cell detecting means. Any oscillations of the beam develop a difference in voltage generated by the photoelectric cells. This difference in voltage is amplified by means of amplifier 38, filtered by filter 39, and the electrostatic damping is caused by means of plates 40 and 41.

Though an electrostatic damping means is described it is to be understood that electromagnetic damping means could be substituted. Numerous other changes will be apparent to those skilled in the art and it is to be understood that the embodiments shown are only illustrative and that many other embodiments may be made all within the scope of the appended claims.

The invention claimed is:

1. In an apparatus for effecting measurements of gravity, a mass movably responsive to the force of gravity and to disturbance forces causing undesired oscillations of said mass, electrical means for detecting said movements, an electric oscillator directly connected to said detecting means adapted to produce oscillating electrical signals, the frequency of said electrical signals being modulated in accordance with the magnitude of the movements of said mass, means for converting said frequency modulated signals into a voltage proportional to the amount of modulation, means for filtering out low frequency components of said voltage caused by movement of said mass due to gravitational force, electrostatic damping means, and electricity conducting means for conducting any modulated output from said electric oscillator to said converting means, for conducting the resulting output of said converting means to said filtering means, and for conducting the output of said filtering means to said electrostatic damping means to thereby damp undesired oscillations of said mass.

2. An apparatus in accordance with claim 1 wherein said electrical detecting means includes a capacitor the capacitance of which is varied in response to the movements of said mass.

3. An apparatus in accordance with claim 2 wherein said converting means comprises a discriminator into which the electric current is fed, the voltage output of said discriminator having the polarity to create an electrostatic force on said electrostatic damping means which opposes the movements of said mass.

4. In an apparatus for effecting measurements of gravity: a mass movably responsive to the force of gravity and to forces causing undesired oscillations of said mass; means for detecting said movements including a light source, an optical system and photoelectric cells arranged in said apparatus to effect the production of electrical signals in response to movements of said mass, filtering means for filtering out low frequency components of said signals caused by movement of said mass due to gravitational force, electrical conducting means transmitting said electrical signals from said detecting means to said filtering means, electrostatic damping means adapted to damp said undesired oscillations of said mass and electrical conducting means for transmitting the output of said filtering means to said electrostatic damping means.

5. An apparatus for effecting measurements of gravity: a capacitor, one plate of which is movable in response to changes in gravity and to forces causing undesired oscillations of said mass in a manner to change the capacitance of said capacitor; an oscillating circuit electrically connected to said capacitor, the frequency of said oscillating circuit being modulated in accordance with a change in capacitance of said capacitor; a discriminator, the output of said discriminator being dependent upon the frequency variations of the input signal, means for conducting any modulated signal from said oscillating circuit to said discriminator, said discriminator generating a voltage proportional to the amount of modulation; means for filtering out low frequency components of said voltage caused by movement of said mass due to gravity force, means for conducting the resulting output of said discriminator to said filtering means and means for conducting the output of said filtering means to said capacitor to thereby cause a damping of the undesired oscillations of said movable plate.

6. In an apparatus for effecting measurements of gravity: a capacitor, one plate of which is movable in response to movements of said mass, a source of light, an optical system and photoelectric cells, said light source, optical system and photoelectric cells being arranged so as to cause the production of electrical signals in response to movements of said mass, filtering means adapted to filter out low frequency components of said electrical signals caused by undesired oscillations of said mass, means for conducting said electrical signals from said photoelectric cells to said filtering means and means for conducting the output electrical signals from said filtering means to said capacitor to thereby damp undesired oscillations of said mass.

References Cited in the file of this patent

UNITED STATES PATENTS

| | | |
|---|---|---|
| 2,136,219 | Scherbatskoy | Nov. 8, 1938 |
| 2,322,681 | Zenor | June 22, 1943 |
| 2,589,710 | La Coste | Mar. 18, 1952 |
| 2,623,741 | Broekhuysen | Dec. 30, 1952 |
| 2,674,885 | Silverman | Apr. 13, 1954 |
| 2,675,222 | Clark | Apr. 13, 1954 |